(12) United States Patent
Tuli

(10) Patent No.: US 6,915,327 B1
(45) Date of Patent: Jul. 5, 2005

(54) PORTABLE HIGH SPEED COMMUNICATION DEVICE PERIPHERAL CONNECTIVITY

(76) Inventor: Raja Singh Tuli, 1155 Rene Levesque West Suite 3500, Montreal, Quebec (CA), H3B 3T6

(*) Notice: Subject to any disclaimer, the term of this patent is extended or adjusted under 35 U.S.C. 154(b) by 538 days.

(21) Appl. No.: 09/698,050

(22) Filed: Oct. 30, 2000

(51) Int. Cl.⁷ ............................................. G06F 15/16
(52) U.S. Cl. ...................................... 709/203; 358/1.15
(58) Field of Search ................................ 709/203, 227, 709/321–327, 202, 219; 358/1.15

(56) References Cited

U.S. PATENT DOCUMENTS

| | | |
|---|---|---|
| 4,899,394 A | 2/1990 | Lee |
| 5,161,213 A | 11/1992 | Knowlton |
| 5,355,447 A | 10/1994 | Knowlton |

(Continued)

FOREIGN PATENT DOCUMENTS

| | | | |
|---|---|---|---|
| EP | 0 833 260 | 1/1998 | |
| EP | 0 889 402 A | 1/1999 | |
| EP | 0 889 636 A | 1/1999 | |
| EP | 890922 A2 | 1/1999 | |
| EP | 1 001 613 A | 5/2000 | |
| EP | 1043876 A2 * | 10/2000 | ........... H04L/29/06 |
| WO | WO 97 30556 A | 8/1997 | |
| WO | WO 97 38389 A | 10/1997 | |
| WO | WO 98 40842 A | 9/1998 | |
| WO | WO 98 43177 A | 10/1998 | |
| WO | WO 99 09658 A | 2/1999 | |
| WO | WO 0033232 A2 | 6/2000 | |
| WO | WO 0033232 A2 * | 6/2000 | ........... G06F/13/15 |
| WO | WO 01 09836 A | 2/2001 | |

OTHER PUBLICATIONS

Rumba Technical Bulletin, "Configuring RUMBA LPR & LPD (16–bit)," 1996, from the Web: 156.27.8.200/ts__rumba/solution/pdf/TCPIP/4002.pdf, pp. 1–11.*
U.S. Appl. No. 09/496,172, filed Feb. 2, 2000.
U.S. Appl. No. 09/498,725, filed Feb. 7, 2000.

(Continued)

*Primary Examiner*—Bradley Edelman
(74) *Attorney, Agent, or Firm*—Blakely, Sokoloff, Taylor & Zafman LLP

(57) ABSTRACT

The invention relates to a Host Computer system, which receives information from the Internet, rasterizes it, compresses it and transmits it to a portable device which decompresses the image to display it on a screen. The Host Computer may also transmit to another computer outfitted with a modem. The Host Computer which contains an operating system, has a variety of peripheral device driver software installed to enable interacting with these peripheral devices via a parallel port, serial port, USB port, or other types of ports. Hence, when a peripheral device related command is executed, data is sent from the peripheral device driver software to the selected port on the Host Computer and is intercepted by another software unit, which may compress this data and subsequently diverts it to the portable device via modem. The particular type of peripheral device dedicated to the peripheral device driver software in the Host Computer is connected to the portable device or computer, and the compressed data received is decompressed by the portable device or computer and sent to the corresponding port. This method allows the user to interface with a wide variety of peripheral devices at portable locations without the need for peripheral device driver software installed at the remote location.

47 Claims, 6 Drawing Sheets

U.S. PATENT DOCUMENTS

| | | |
|---|---|---|
| 5,379,057 A | 1/1995 | Clough et al. |
| 5,444,763 A | 8/1995 | Lazaridis et al. |
| 5,534,893 A | 7/1996 | Hansen, Jr. et al. |
| 5,546,524 A | 8/1996 | Chow et al. |
| 5,546,538 A | 8/1996 | Cobbley et al. |
| 5,555,241 A | 9/1996 | Lazaridis et al. |
| 5,559,800 A | 9/1996 | Mousseau et al. |
| 5,581,243 A | 12/1996 | Ouellette et al. |
| 5,600,790 A | 2/1997 | Barnstijn et al. |
| 5,657,345 A | 8/1997 | Lazaridis |
| 5,682,525 A | 10/1997 | Bouve et al. |
| 5,699,255 A | 12/1997 | Ellis et al. |
| 5,701,451 A | 12/1997 | Rogers et al. |
| 5,721,908 A | 2/1998 | Lagarde et al. |
| 5,727,159 A | 3/1998 | Kikinis |
| 5,758,110 A | 5/1998 | Boss et al. |
| 5,761,663 A | 6/1998 | Lagarde et al. |
| 5,764,235 A | 6/1998 | Hunt et al. |
| 5,765,176 A | 6/1998 | Bloomberg |
| 5,778,092 A | 7/1998 | MacLeod et al. |
| 5,793,964 A | 8/1998 | Rogers et al. |
| 5,802,312 A | 9/1998 | Lazaridis et al. |
| 5,809,415 A | 9/1998 | Rossmann |
| 5,810,680 A | 9/1998 | Lobb et al. |
| 5,831,679 A | 11/1998 | Montgomery et al. |
| 5,838,906 A | 11/1998 | Doyle et al. |
| 5,856,827 A | 1/1999 | Sudo |
| 5,862,348 A | 1/1999 | Pedersen |
| 5,867,662 A * | 2/1999 | Riggs ........................ 709/228 |
| 5,884,014 A | 3/1999 | Huttenlocher et al. |
| 5,884,056 A | 3/1999 | Steele |
| 5,893,095 A | 4/1999 | Jain et al. |
| 5,910,805 A | 6/1999 | Hickey et al. |
| 5,915,250 A | 6/1999 | Jain et al. |
| 5,923,736 A | 7/1999 | Shachar |
| 5,925,103 A | 7/1999 | Magallanes et al. |
| 5,928,324 A | 7/1999 | Sloan |
| 5,938,737 A | 8/1999 | Smallcomb et al. |
| 5,949,412 A | 9/1999 | Huntsman |
| 5,949,875 A | 9/1999 | Walker et al. |
| 5,956,716 A | 9/1999 | Kenner et al. |
| 5,961,586 A | 10/1999 | Pedersen |
| 5,961,603 A | 10/1999 | Kunkel et al. |
| 5,966,135 A | 10/1999 | Roy et al. |
| 5,974,441 A | 10/1999 | Rogers et al. |
| 5,978,835 A | 11/1999 | Ludwig et al. |
| 5,987,256 A | 11/1999 | Wu et al. |
| 5,995,102 A | 11/1999 | Rosen et al. |
| 5,995,105 A | 11/1999 | Reber et al. |
| 6,003,065 A | 12/1999 | Yan et al. |
| 6,006,105 A | 12/1999 | Rostoker et al. |
| 6,006,231 A | 12/1999 | Popa |
| 6,006,241 A | 12/1999 | Purnaveja et al. |
| 6,008,836 A | 12/1999 | Bruck et al. |
| 6,011,546 A | 1/2000 | Bertram |
| 6,011,905 A | 1/2000 | Huttenlocher et al. |
| 6,012,083 A | 1/2000 | Savitzky et al. |
| 6,012,086 A | 1/2000 | Lowell |
| 6,014,133 A | 1/2000 | Yamakado et al. |
| 6,014,694 A | 1/2000 | Aharoni et al. |
| 6,014,706 A | 1/2000 | Cannon et al. |
| 6,016,535 A | 1/2000 | Krantz et al. |
| 6,021,409 A | 2/2000 | Burrows |
| 6,023,749 A | 2/2000 | Richardson |
| 6,026,435 A | 2/2000 | Enomoto et al. |
| 6,034,686 A | 3/2000 | Lamb et al. |
| 6,035,281 A | 3/2000 | Crosskey et al. |
| 6,047,047 A | 4/2000 | Aldridge et al. |
| 6,049,539 A | 4/2000 | Lee et al. |
| 6,049,821 A | 4/2000 | Theriault et al. |
| 6,049,831 A | 4/2000 | Gardell et al. |
| 6,052,130 A | 4/2000 | Bardon et al. |
| 6,054,985 A | 4/2000 | Morgan et al. |
| 6,057,857 A | 5/2000 | Bloomfield |
| 6,065,057 A | 5/2000 | Rosen et al. |
| 6,065,800 A | 5/2000 | Olson |
| 6,067,571 A | 5/2000 | Igarashi et al. |
| 6,072,483 A | 6/2000 | Rosin et al. |
| 6,072,598 A | 6/2000 | Tso |
| 6,073,168 A | 6/2000 | Mighdoll et al. |
| 6,073,483 A | 6/2000 | Nitecki et al. |
| 6,081,623 A | 6/2000 | Bloomfield et al. |
| 6,084,584 A | 7/2000 | Nahi et al. |
| 6,087,952 A | 7/2000 | Prabhakaran |
| 6,092,107 A | 7/2000 | Eleftheriadis et al. |
| 6,097,352 A | 8/2000 | Zavracky et al. |
| 6,101,180 A | 8/2000 | Donahue et al. |
| 6,104,392 A | 8/2000 | Shaw et al. |
| 6,105,021 A | 8/2000 | Berstis |
| 6,108,655 A | 8/2000 | Schleimer et al. |
| 6,108,727 A | 8/2000 | Boals et al. |
| 6,118,449 A | 9/2000 | Rosen et al. |
| 6,118,899 A | 9/2000 | Bloomfield et al. |
| 6,119,135 A | 9/2000 | Helfman |
| 6,121,970 A | 9/2000 | Guedalia |
| 6,125,209 A | 9/2000 | Dorricott |
| 6,138,156 A | 10/2000 | Fletcher et al. |
| 6,157,935 A | 12/2000 | Tran et al. |
| 6,182,054 B1 | 1/2001 | Dickinson et al. |
| 6,182,127 B1 | 1/2001 | Cronin, III et al. |
| 6,185,625 B1 | 2/2001 | Tso et al. |
| 6,192,393 B1 | 2/2001 | Tarantino et al. |
| 6,195,667 B1 | 2/2001 | Duga et al. |
| 6,219,465 B1 | 4/2001 | Nacman et al. |
| 6,226,400 B1 | 5/2001 | Doll |
| 6,233,541 B1 | 5/2001 | Butts et al. |
| 6,256,750 B1 * | 7/2001 | Takeda ........................ 714/11 |
| 6,262,732 B1 | 7/2001 | Coleman et al. |
| 6,263,347 B1 | 7/2001 | Kobayashi et al. |
| 6,282,294 B1 | 8/2001 | Deo et al. |
| 6,286,003 B1 | 9/2001 | Muta |
| 6,295,059 B1 | 9/2001 | Lentz et al. |
| 6,298,162 B1 | 10/2001 | Sutha et al. |
| 6,304,928 B1 | 10/2001 | Mairs et al. |
| 6,313,880 B1 | 11/2001 | Smyers et al. |
| 6,317,781 B1 | 11/2001 | De Boor et al. |
| 6,345,279 B1 | 2/2002 | Li et al. |
| 6,356,283 B1 | 3/2002 | Guedalia |
| 6,359,603 B1 | 3/2002 | Zwern |
| 6,404,416 B1 | 6/2002 | Kahn et al. |
| 6,411,275 B1 | 6/2002 | Hedberg |
| 6,418,310 B1 | 7/2002 | Dent |
| 6,421,716 B1 * | 7/2002 | Eldridge et al. ............ 709/219 |
| 6,424,369 B1 | 7/2002 | Adair |
| 6,433,801 B1 | 8/2002 | Moon et al. |
| 6,449,639 B1 | 9/2002 | Blumberg |
| 6,466,198 B1 | 10/2002 | Feinstein |
| 6,477,143 B1 | 11/2002 | Ginossar |
| 6,480,710 B1 | 11/2002 | Laybourn et al. |
| 6,487,597 B1 | 11/2002 | Horie et al. |
| 6,535,743 B1 | 3/2003 | Kennedy, III et al. |
| 6,536,043 B1 | 3/2003 | Guedalia |
| 6,539,077 B1 | 3/2003 | Ranalli et al. |
| 6,544,295 B1 | 4/2003 | Bodnar |
| 6,553,412 B1 | 4/2003 | Kloba et al. |
| 6,564,250 B1 | 5/2003 | Nguyen |
| 6,565,611 B1 | 5/2003 | Wilcox et al. |
| 6,571,245 B2 | 5/2003 | Huang et al. |
| 6,574,501 B2 | 6/2003 | Lambert et al. |
| 6,598,087 B1 * | 7/2003 | Dixon et al. ................. 709/236 |

| | | | |
|---|---|---|---|
| 6,628,243 B1 | | 9/2003 | Lyons et al. |
| 6,633,314 B1 | | 10/2003 | Tuli |
| 6,646,759 B1 | * | 11/2003 | Koga .................... 358/1.9 |
| 6,674,445 B1 | | 1/2004 | Chithambaram et al. |
| 6,677,965 B1 | | 1/2004 | Ullmann et al. |
| 6,690,403 B1 | | 2/2004 | Tuli |
| 6,704,024 B2 | | 3/2004 | Robotham et al. |
| 2001/0034770 | | 10/2001 | O'Brien |
| 2001/0047441 | | 11/2001 | Robertson |
| 2001/0052911 | | 12/2001 | Boyle et al. |
| 2002/0015042 | | 2/2002 | Robotham |

OTHER PUBLICATIONS

U.S. Appl. No. 09/501,585, filed Feb. 10, 2000.
U.S. Appl. No. 09/504,807, filed Feb. 16, 2000.
U.S. Appl. No. 09/504,808, filed Feb. 16, 2000.
U.S. Appl. No. 09/504,809, filed Feb. 16, 2000.
U.S. Appl. No. 09/625,272, filed Jul. 25, 2000.
U.S. Appl. No. 09/637,628, filed Aug. 14, 2000.
U.S. Appl. No. 09/650,412, filed Aug. 29, 2000.
U.S. Appl. No. 09/677,857, filed Oct. 3, 2000.
U.S. Appl. No. 09/688,879, filed Oct. 17, 2000.
U.S. Appl. No. 09/708,031, filed Nov. 8, 2000.
U.S. Appl. No. 09/764,418, filed Jan. 19, 2001.
U.S. Appl. No. 09/768,135, filed Jan. 24, 2001.
U.S. Appl. No. 09/781,265, filed Feb. 13, 2001.
U.S. Appl. No. 09/803,884, filed Mar. 13, 2001.
U.S. Appl. No. 09/879,972, filed Jun. 14, 2001.
U.S. Appl. No. 10/238,643, filed Sep. 11, 2002.
U.S. Appl. No. 10/308,237, filed Dec. 3, 2002.
U.S. Appl. No. 10/448,700, filed May 29, 2003.
U.S. Appl. No. 10/779,441, filed Feb. 13, 2004.
U.S. Appl. No. 10/793,534, filed Mar. 2, 2004.
International Search Report, PCT/CA 01/01057, 2 pages, 2003.
Joel F. Bartlett, "Experience with a Wireless World Wide Web Client", Mar., 1995.
International Search Report, PCT/US 01/03382, 1 pages, 2001.
International Search Report, PCT/CA 01/00114, 3 pages, 2001.
International Search Report, PCT/CA 01/00126, 3 pages, 2001.
International Search Report, PCT/CA 01/00170, 4 pages, 2002.
International Search Report, PCT/CA 01/00169, 3 pages, 2002.
International Search Report, PCT/CA 02/00048, 5 pages, 2003.
Tagawa Norio, "Data Relay System and Data Repeater Applied to the System", Patent Abstracts of Japan, vol. 1997, No. 10, Jun. 24, 1997.
Armando Fox et al, "Experience with Top Gun Wingman: a proxy–based graphical web browser fro the 3Com PalmPilot", *Middleware,* IFIP International Conference on Distributed Systems, Platforms and Open Distributed Processing, Sep. 1998, pp. 407–424.

Richard Han, et al., "Dynamic Adaptation in an Image Transcoding Proxy for Mobile Web Browsing", *IEEE Personal Communication,* Dec., 1998, pp. 8–17.
Timothy Bickmore, et al., "Web Page Filtering and Re–Authoring for Mobile Users", *The Computer Journal,* vol. 42, No. 6, 1999.
Tristan Richardson, Quentin Stafford–Fraser, Kenneth R. Wood & Andy Hopper, "Virtual Network Computing", *IEEE Internet Computing,* vol. 2 No. 1, Jan./Feb. 1998 pp 33–38.
Citrix Systems, Inc.: "Critix Announces New Product and Product Enhancements that Speed Web Application", http://www.citrix.com/press/news/releases/20000905_product_enhance.asp, Sep. 5, 2000.
Boutell, T. et al., "PNG (Portable Network Graphics) Specification Version 1.0", RFC 2083, pp. 1–102, Mar. 1997.
Halfhill, T.R., "Good–Bye GUI . . . Hello, NUI," BYTE Magazine, www.byte.com, vol. 22, No. 7, pp. 60–64, 66, 68, 70, and 72, Jul. 1997.
Masinter, L., "Returning Values from Forms: multipart/form–data," RFC 2388, pp. 1–9, Aug. 1998.
Jao, C.S. et al., "The display of photographic–quality images on the Web: a comparison of two technologies," IEEE Transactions on Information Technology In Biomediciene, vol. 3, iss. 1, pp. 70–73, Mar. 1999.
Kaljuvee, O. et al., "Efficient Web form entry on PDAs," ACM Proceedings of the tenth International Conference on WWW, ACM Press, ISBN: 1–58113–348–0, pp. 663–672, May 2001.
Selected pages from AT&T Wireless, Bell Atlantic Mobile, and Nextel, as delivered through the Wayback Machine, web.archieve.org.
Lewis, Ted. "Information Appliances: Gadget Netopia" *Computer,* vol. 31, issue 1, Jan. 1998, pp. 59–68.
Cimini, Leonard J., Jr., et al. "Advanced Cellular Internet Service (ACIS)", *IEEE communication Magazine,* vol. 36, Issue 10 Oct. 1998, pp. 150–159.
Oliphant, Malcolm W. "The Mobile Phone Meets the Internet", *IEEE Spectrum,* vol. 36, Issue 8, Aug. 1999, pp. 20–28.
Lind, R., et al. "The Network Vehicle—A Glimpse into the Future of Mobile Multi–Media", *IEEE ASE Systems Magazine,* Sep. 1999, pp. 27–32.
Gbaguidi, Constant, et al. "A programmable Architecture for the Provision of Hybrid Services", *IEEE communications Magazine,* vol. 27, Issue 7, Jul. 1999, pp. 110–116.
Narayanaswamy, Shankar, et al. "User Interface for a PCS Smart Phone", *IEEE Int.. Conference on Multimedia Computing and Systems,* vol. 1 Jun. 1999, pp. 777–781.
International Search Report, PCT/CA 02/00133, 3 pages, 2003.
International Search Report, PCT/CA 02/00048, 3 pages, 2003.

* cited by examiner

PORTABLE HIGH SPEED COMMUNICATION DEVICE PERIPHERAL CONNECTIVITY

BACKGROUND OF THE INVENTION

1. Field of the Invention

The invention relates to a Host Computer system, which receives information, rasterizes it, compresses it, and transmits it to a remote portable device or Personal Computer (PC) system, which decompresses the image to display it on a screen. The result is a cost effective Internet access solution which allows interaction between the device and a Host Computer. It is a further aim of the present invention, to provide connectivity to a variety of Peripheral Devices, such as printers, scanners, etc. The user will also be able to interface with a wide variety of peripheral devices at remote locations without the need for peripheral device driver software installed at the remote location.

2. Description of the Prior Art

The background of the present invention includes U.S. Pat. No. 5,925,103, Internet Access Device, which describes an improved Internet access system, vastly different from the present invention. Other prior art would include palm top computers, hand-held computers and cellular telephones that have limited processing power due to design restrictions. Thus, these computers are much slower for accessing the Internet and World Wide Web. Most prior art does not allow the user to scan and print to a wide variety of peripheral devices from remote locations, without the need for associated software installed in the portable device, as in the present invention.

SUMMARY OF THE INVENTION

The present invention relates to a portable high speed Internet access device that can access the Internet and World Wide Web as a wireless device, and also interface with a variety of peripheral devices remotely.

A number of prior applications by the same inventor of the present application disclose a Web server connected to the Internet. This server contains a virtual browser which takes the image displayed in the browser and converts this image into a bit map which is compressed, and communicates via telephone lines to a cellular telephone. The cellular telephone is connected to the high speed internet access device of the invention commonly referred to as a PDA (Personal Digital Assistant) which is comprised of a display screen, battery and related micro-electronics. This enables the PDA to receive, decompress and view the bit map image sent from the virtual browser, and more importantly, through cellular phone connectivity to be able to input data from the PDA directly onto the server. The PDA and cellular phone combination may be replaced by another computer outfitted with a modem. In particular, the Host Computer or server receives vector information Or compressed data in the form of HTML, JPEG, etc., which is displayed on a web page. The virtual browser virtually displays a virtual image on the server. That image, in whole or parts, is recompressed and sent to the PDA. The recompressed data format sent to the PDA, is not necessarily in the same format as the compressed data format first received by the server. Another embodiment involves the server receiving vector information such as HTML or text and then rasterizing it to bit map format. It can then be rendered in memory through the virtual browser and recompressed through a "loss less" method and sent to the PDA.

The disclosure of the prior applications by the same inventor of the present application also comprises the PDA with an electronic touch screen keyboard, which remains invisible and only appears on a portion of the display screen when called upon by touching the keyboard icon. The entire display screen is covered with a transparent touch panel, which is essentially a matrix array of electrodes, which can detect the location of any pressure points applied to it.

In accordance with the present invention, the Host Computer, which contains an operating system such as Windows NT, has a variety of printer driver software installed to enable printing from specific types of printers via a parallel port, serial port, USB port, or other types of ports. Hence, when a print command is executed, data is sent from the printer driver software to the selected port and is intercepted by another software unit, which may compress the data and subsequently diverts it to the portable device via modem. The particular type of printer dedicated to the printer driver software in the Host Computer is connected to the remote PDA or computer, and the data received may be decompressed if necessary by the remote PDA or computer and sent to the corresponding port. The printer connected to this port would print normally from the portable device using its standard protocol as if it were connected directly to the Host Computer. This same principle is applied to all other peripheral devices that may be connected to standard ports on a computer, whereby the peripheral's driver software is installed directly on the Host Computer. This method allows the user to interface with a wide variety of peripheral devices at remote locations without the need for peripheral device driver software installed at the remote location.

BRIEF DESCRIPTION OF THE DRAWINGS

The invention is described in more detail below with respect to an illustrative embodiment shown in the accompanying drawings in which.

DETAILED DESCRIPTION OF THE PREFERRED EMBODIMENTS

To facilitate description, any numeral identifying an element in one figure will represent the same element in any other figure.

The principal embodiment of the present invention aims to provide a portable device that allows a user to access the Internet or the World Wide Web (WWW), which is a device similar to a palm top computer. It is an aim of the present invention, to offer a cost-competitive device. It is a further aim of the present invention to allow the user to interface with a wide variety of peripheral devices at remote locations, without the need for peripheral device driver software installed at the remote location.

Currently, existing palm top devices such as the Palm Pilot VII and Windows CE type devices contain an operating system, and within the operating system a mini-browser to interpret information received from the WWW or Internet and then display this information on the screen. This requires a powerful microprocessor, which is not advantageous in conserving power for portable applications and also minimizing costs.

Figure 1:
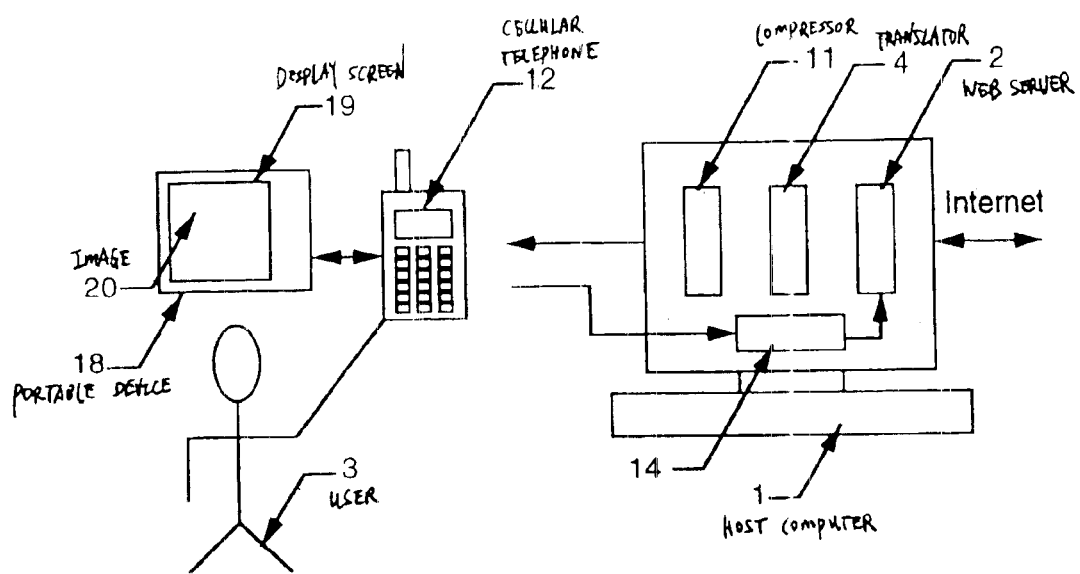
FIG. 1 illustrates elements in the Host Computer, which communicates with a remote user and the device of the invention.
Figure 2:
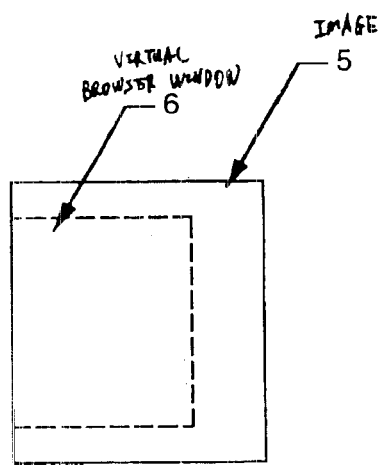
FIG. 2 illustrates the image to be displayed compared with the displayable area of a browser window.
Figure 4:
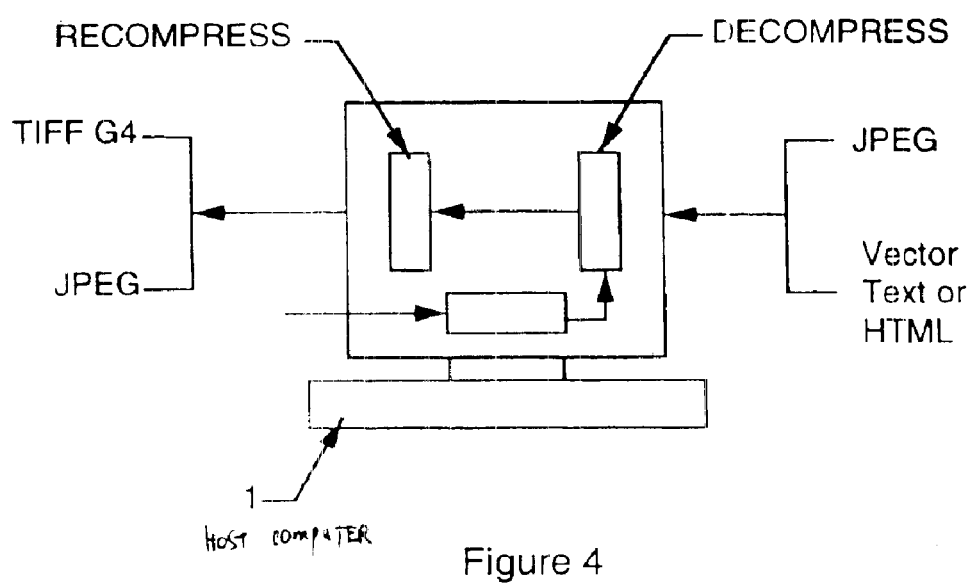
FIG. 4 illustrates file formats received and sent by the Host Computer.

A general description of the prior applications by the same inventor of the present application is disclosed in FIG. 1 with further reference to U.S. patern applications Ser. Nos. 09/496,172, 09/501,585, 09/504,809, 09/504,808, and 09/504,807 now U.S. Pat. No. 6,633,314. A Host Computer 1 is depicted which is connected to the Internet, and that host may also be a Web server. Running in the Host Computer, is a Web server program 2. When a remote user 3 requests to view a Web page (or electronic message etc.) the Web server software receives HTML, JAVA, or other types of information and transmits this information to another software, the Browser Translator 4. This software translates the information, (i.e. the entire image comprising graphics and text) received in the form of HTML, Java, etc. (as information may be gathered from different sources) and translates it to a black and white bit map or raster image. In another embodiment, the software translates the information into a raster or color image. The image 5, as shown in FIG. 2, contains the information that would normally be displayed on a single Web page. The translation program therefore, also acts as a virtual browser. As can be seen in FIG. 2, the image 5 to be displayed in a browser window 6 is usually larger than the displayable area of the browser window 6. The cellular telephone 12 of FIG. 1 is connected to the high speed internet access device 18 of the invention commonly referred to as a PDA (Personal Digital Assistant) which is comprised of a display screen 19, battery and related micro-electronics. This enables the PDA to receive, decompress and view the bit map image sent from the virtual browser 6, and more importantly, through cellular phone connectivity to be able to input data from the PDA directly onto the server. In particular, the Host Computer or server receives vector information or compressed data in the form of HTML, JPEG, etc., which is displayed on a web page. The virtual browser virtually displays a virtual image on the server. That image, in whole or parts, is recompressed and sent to the PDA. The recompressed data format sent to the PDA is not necessarily in the same format as the compressed data format first received by the server, as illustrated in FIG. 4. For example, the incoming data from a Web page may be in the form of JPEG which is decompressed and displayed on the virtual browser. This data is recompressed and sent to the PDA but can be in the form of TIFF G4 or other formats, and not necessarily JPEG as initially received.

Another embodiment involves the server receiving vector information such as HTML or text and then rasterizing it to bit map format. It can then be rendered in memory through the virtual browser and recompressed through a "loss less" method and sent to the PDA.

Figure 3:
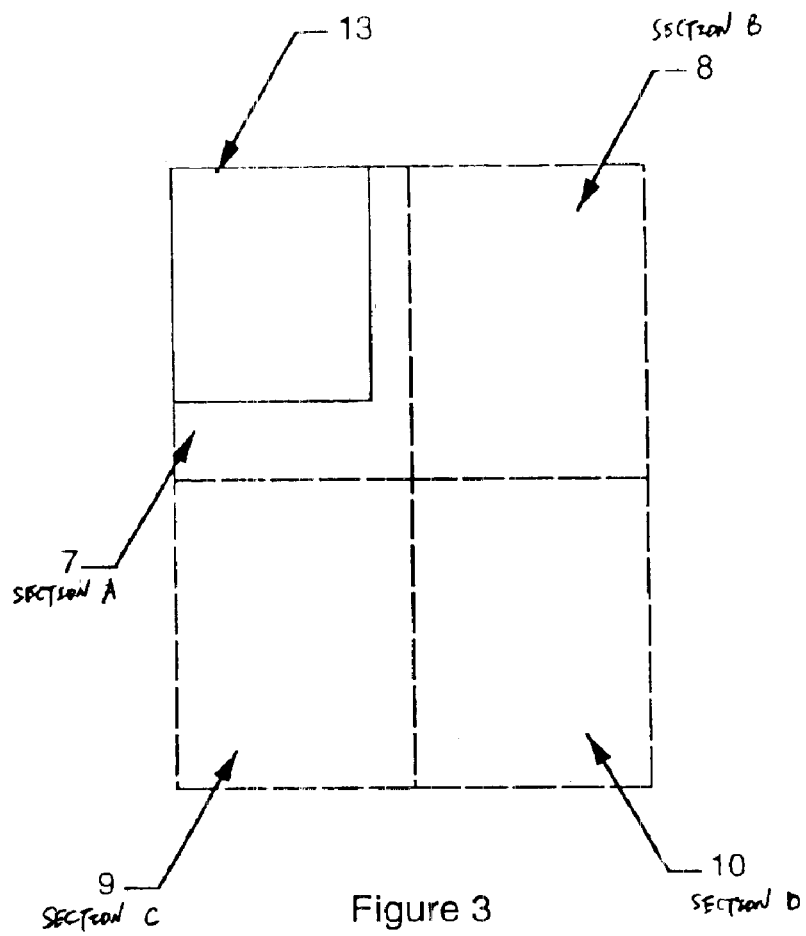
FIG. 3 shows a typical subdivision of the virtual image to be displayed.

The image 5 of FIG. 2 is further divided into sections 7, 8, 9, and 10, as shown in FIG. 3. The image is divided after the bitmap or raster is created. The reason for the division (as will be explained later) is for the purpose of display priority on the user's display. The image 5 is then sent to another program 11 running on the Host Computer 1 (FIG. 1), which compresses the image using a loss-less compression method. The compression method may be group 3 or group 4, or another method. The programs 4 and 11 can have multiple instances running simultaneously on the host server for the purpose of connecting to multiple users. The compressed image, after being processed by program 11, is sent to the user, using a protocol in which information may be broken down into packets.

Figure 5:
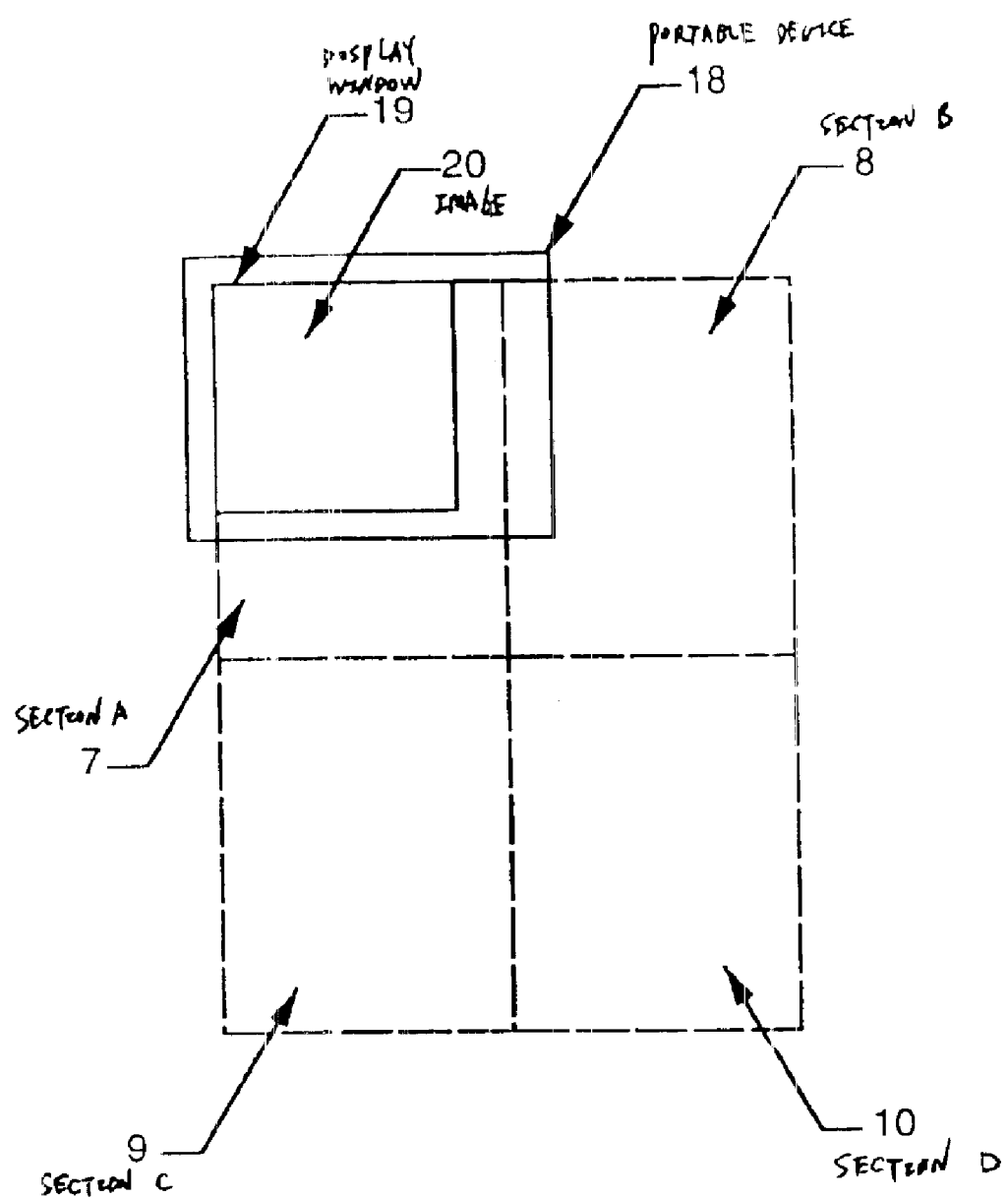
FIG. 5 illustrates the displayable area of the device with respect to portions of the virtual image, which are sequentially decompressed prior to viewing.

The information is received by the device 18 of the invention in FIG. 5 which has the ability to display a monochrome image 20, in its display window 19. The information is decompressed and displayed in the order of priority such that part of image 7 of FIG. 5, which substantially or completely covers the displayable area 19 of the device, is decompressed and displayed first and then sequentially the portions 8, 9 and 10 of the image are decompressed, and stored in an internal memory of the device to be displayed later when the user scrolls up, down, or sideways to these parts of the image.

Further, the information received from the server by the device 18 of the invention in FIG. 5 remains compressed, and only the area viewed by the device is decompressed, since the area of a web page to be viewed is larger than the device's display area. As the user scrolls up, down or sideways, only the parts of the image to be displayed are decompressed prior to viewing.

A CPU resident in the device therefore has the ability to decompress a bit map or raster image that may be larger than the size of the display and allow the user to traverse this bit map or raster image. The primary method of traversing the image is through conventional scroll bars positioned at the sides of the image. The resident CPU on the device has no ability to determine which part or parts of the image that are being displayed represent links to other Web pages, etc. Thus, the translator program 4 (FIG. 1) translates the image in the virtual browser 6 such that the words that represent links on the page 5 (FIG. 2) are translated to be slightly bolder or underlined. The user may therefore consider text that is is bold or underlined to be links.

Figure 6:
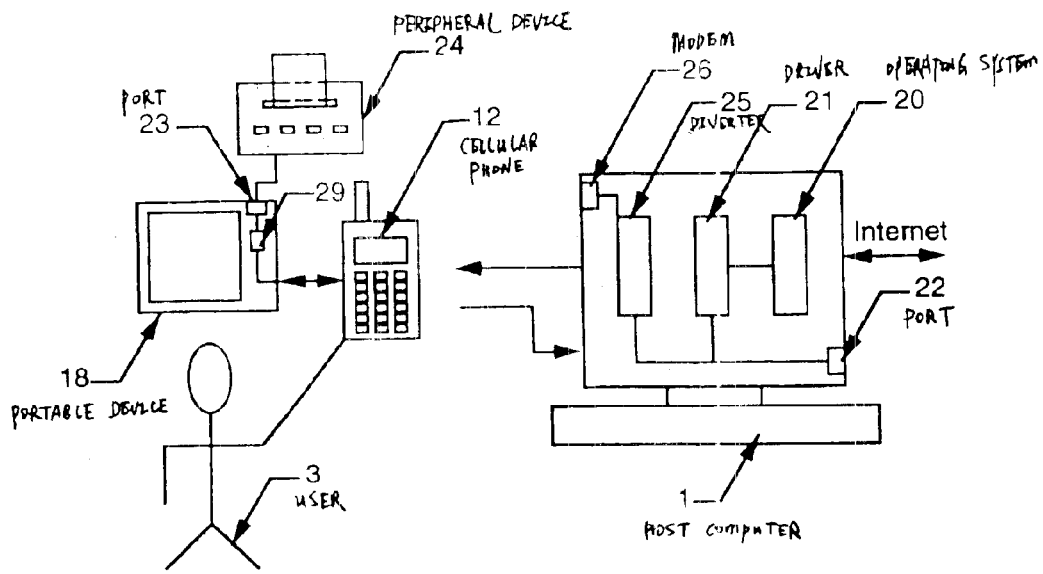
FIG. 6 illustrates the portable device of the present invention enabling the user to operate peripheral devices through a standard port or other ports.

In accordance with FIG. 6 of the present invention, the Host Computer 1, contains an operating system 20 such as Windows NT, and has a variety of peripheral driver software 21 installed, to enable operation of these peripheral devices via a standard port 22, which may be a parallel port, serial port, USB port, or other types of ports. The present invention allows the user to interface the portable device 18 with a variety of peripheral devices 24 through a similar port 23 which may be the same as the standard port 22 or a compact version, or a wireless interface. For demonstration purposes, the peripheral device 24 will be a printer connected to port 23 on the portable device. Hence, when a user wishes to print a viewed document on the portable device, a print command is executed by the portable device 18, and a print message is sent to the Host Computer 1, which instructs the Host Computer that a print command has been executed by the portable device. The Host Computer 1 initiates the printer driver software 21, which brings up a window displaying various print options for the user to make selections. An image of this window is sent from the Host Computer 1 to the portable device 18 to be displayed on its screen. The user would then click on various parts of the image on the display screen and a message is sent each time to the Host Computer informing of the click locations, and the Host Computer would input these clicks in the identical corresponding locations on its window of the printer driver's displayed print options. Any changes made to the display of this window on the Host Computer as a result of these instructions would result in a refreshed image of this window being sent to the portable device 18 to be displayed on its screen. When the user is satisfied with the print options selected and clicks on the "OK" icon on the screen of the portable device 18, a message is sent to the Host computer which enters "OK" in the identical corresponding location on its window of the printer driver's displayed print options. The print option window disappears and a refreshed image of the document appears on the screen of the Host Computer, and an image of this is sent to the portable device to be displayed. The application program running in the Host Computer 1 sends the data to be printed to the printer driver software 21, which transforms this data to a language the printer can understand. Hence, this data to be printed is then sent by the printer driver software 21 to the port 22 on the Host Computer 1, which supports two-way communication with any printer connected to port 22, but this data transfer is intercepted by software 25 which diverts it to the port 23 on the portable device 18. The software 25 basically transports the port 22 on the Host Computer 1 to the port 23 on the portable device 18, so that the printer driver software 21 believes it is communicating with port 22 on the Host Computer 1, whereas it is actually communicating with port 23 on the portable device 18. The software 25 interacts with another software 29 in the portable device 18, to support a two-way communication between the port 23 and the printer 24 as data is transferred back and forth between the printer driver 21 and the printer 24.

In another embodiment of the invention, the print command is executed by the user 3 of FIG. 6, from the portable device 18. A print icon is selected from the display screen of the portable device, and the location of the selected print icon on the display screen is sent as a message to the Host Computer 1, which has a mapped layout of the portable devices' display screen and determines that a print command has been executed. The Host Computer 1 initiates the printer driver software 21, which brings up a window displaying various print options for the user to make selections. An image of this window is sent from the Host Computer 1 to the portable device 18 to be displayed on its screen. The user would then click on various parts of the image on the display screen and a message is sent each time to the Host Computer informing of the click locations, and the Host Computer would input these clicks in the identical corresponding locations on its window of the printer driver's displayed print options. Any changes made to the display of this window on the Host Computer as a result of these instructions would result in a refreshed image of this window being sent to the portable device 18 to be displayed on its screen. When the user is satisfied with the print options selected and clicks on the "OK" icon on the screen of the portable device 18, a message is sent to the Host computer which enters "OK" in the identical corresponding location on its window of the printer driver's displayed print options. The print option window disappears and a refreshed image of the document appears on the screen of the Host Computer, and an image of this is sent to the portable device to be displayed. The application program running in the Host Computer 1 sends the data to be printed to the printer driver software 21, which transforms this data to a language the printer can understand. Hence, this data to be printed is then sent by the printer driver software 21 to the port 22 on the Host Computer 1, which supports two-way communication with any printer connected to port 22, but this data transfer is intercepted by software 25 which diverts it to the port 23 on the portable device 18. The software 25 basically transports the port 22 on the Host Computer 1 to the port 23 on the portable device 18, so that the printer driver software 21 believes it is communicating with port 22 on the Host Computer 1, whereas it is actually communicating with port 23 on the portable device 18. The software 25 interacts with another software 29 in the portable device 18, to support a two-way communication between the port 23 and the printer 24 as data is transferred back and forth between the printer driver 21 and the printer 24.

Figure 7:
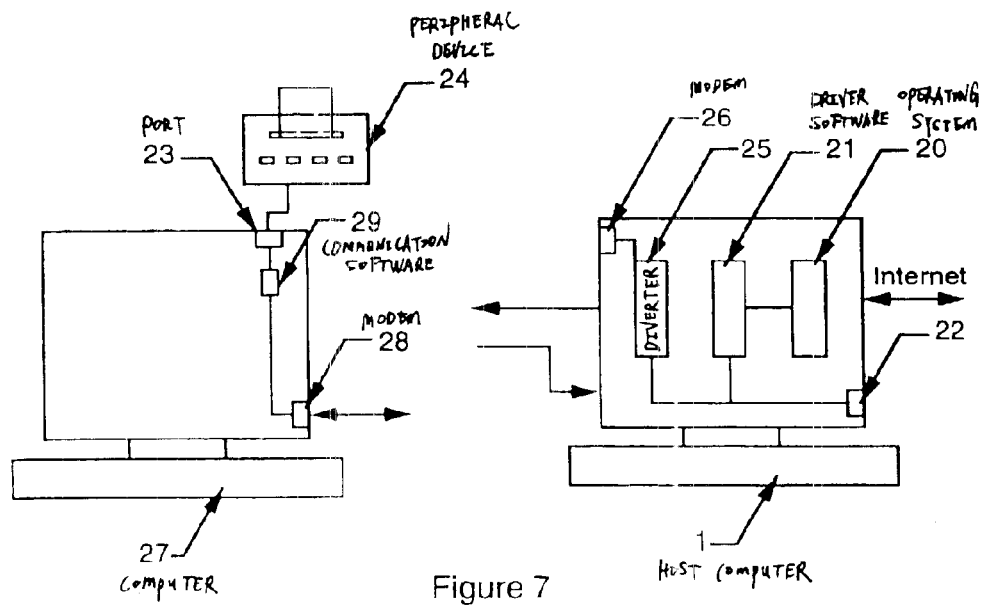
FIG. 7 illustrates a computer connected to a modem of the present invention enabling the user to operate peripheral devices through a standard port or other ports.
Figure 8:
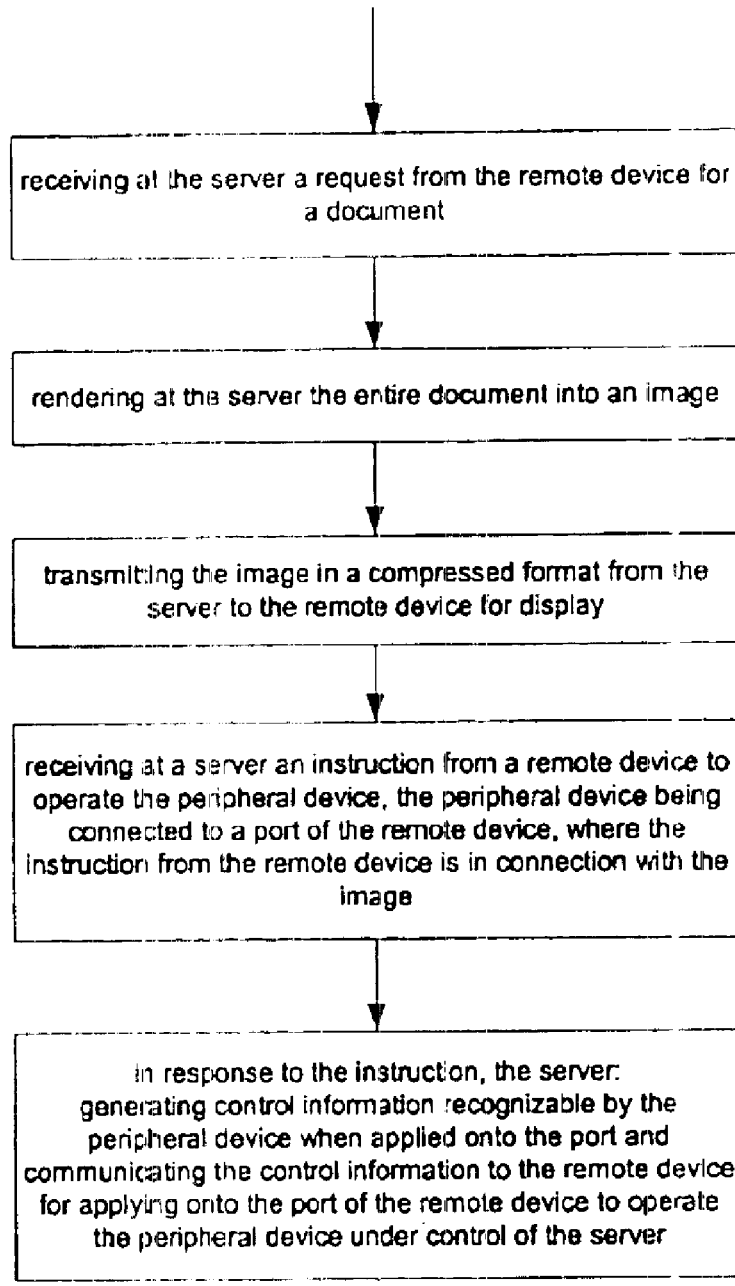
FIGS. 8–9 illustrate methods of some embodiments of the present invention.
Figure 9:
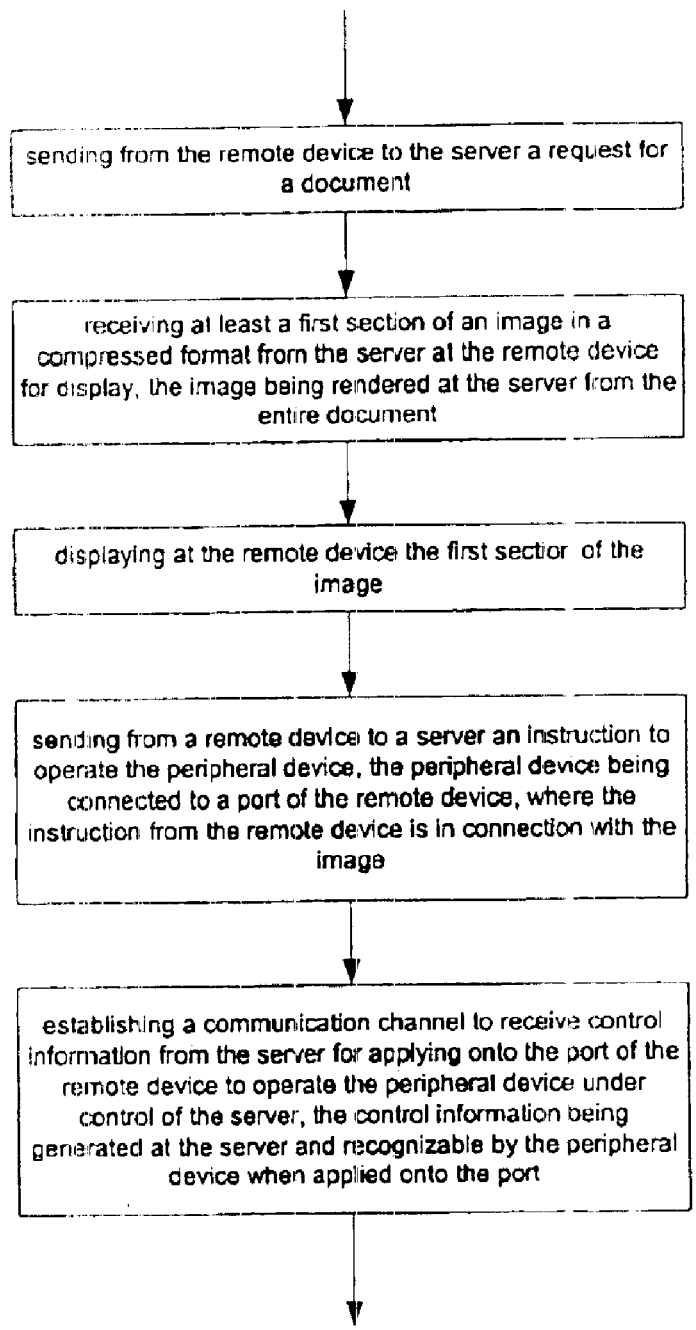

In another embodiment of the invention, in accordance with FIG. 7, the portable device may be another computer 27 connected to a dedicated modem 28, which receives data from the modem 26 on the Host Computer 1. The computer 27 is a simple terminal with no operating system running in it, similar to the portable device 18. This embodiment allows the user to interface the computer 27 with a variety of peripheral devices 24 through a similar port 23 which may be the same as the standard port 22 or a compact version, or a wireless interface. For demonstration purposes, the peripheral device 24 will be a printer connected to port 23 on the computer 27. Hence, when a user wishes to print a viewed document on the computer 27, a print command is executed by the computer 27, and a print message is sent to the Host Computer 1, which instructs the Host Computer that a print command has been executed by the computer 27. The Host Computer 1 initiates the printer driver software 21, which brings up a window displaying various print options for the user to make selections. An image of this window is sent from the Host Computer 1 to the computer 27 to be displayed on its screen. The user would then click on various parts of the image on the display screen and a message is sent each time to the Host Computer informing of the click locations, and the Host Computer would input these clicks in the identical corresponding locations on its window of the printer driver's displayed print options. Any changes made to the display of this window on the Host Computer as a result of these instructions would result in a refreshed image of this window being sent to the computer 27 to be displayed on its screen. When the user is satisfied with the print options selected and clicks on the "OK" icon on the screen of the computer 27, a message is sent to the Host computer which enters "OK" in the identical corresponding location on its window of the printer driver's displayed print options. The print option window disappears and a refreshed image of the document appears on the screen of the Host Computer, and an image of this is sent to the computer 27 to be displayed. The application program running in the Host Computer 1 sends the data to be printed to the printer driver software 21, which transforms this data to a language the printer can understand. Hence, this data to be printed is then sent by the printer driver software 21 to the port 22 on the Host Computer 1, which supports two-way communication with any printer connected to port 22, but this data transfer is intercepted by software 25 which diverts it to the port 23 on computer 27. The software 25 basically transports the port 22 on the Host Computer 1 to the port 23 on the computer 27, so that the printer driver software 21 believes it is communicating with port 22 on the Host Computer 1, whereas it is actually communicating with port 23 on the computer 27. The software 25 interacts with another software 29 in the computer 27, to support a two-way communication between the port 23 and the printer 24 as data is transferred back and forth between the printer driver 21 and the printer 24.

I claim:

1. A method to operate a peripheral device, the method comprising:

receiving at a server a request from a remote device for a document;

rendering at the server the entire document into an image;

transmitting the image in a compressed format from the server to the remote device for display;

receiving at the server an instruction from the remote device to operate the peripheral device, the peripheral device being connected to a port of the remote device;

in response to the instruction, the server:

generating control information recognizable by the peripheral device when applied onto the port; and communicating the control information to the remote device for applying onto the port of the remote device to operate the peripheral device under control of the server;

wherein the instruction from the remote device is in connection with the image.

2. The method of claim 1, wherein the remote device contains no software device driver for the peripheral device connected to the port of the remote device.

3. The method of claim 1, further comprising:

generating at the server an image showing options to operate the peripheral device;

transmitting the image from the server to the remote device for display;

receiving at the server from the remote device data specifying user input relative to the image; and applying at the server one or more options to operate the peripheral device according to the data specifying the user input relative to the image.

4. The method of claim 1, wherein a two-way communication channel is established for communication between the server and the peripheral device through the port of the remote device to operate the peripheral device under the control of the server.

5. The method of claim 4, wherein the peripheral device comprises a printer.

6. The method of claim 5, wherein the instruction from the remote device requests to print a document; the server generates the control information according to the document for printing using the printer; and, the document is not received from the remote device.

7. The method of claim 1, wherein the control information is transmitted to the remote device via a wireless connection.

8. The method of claim 1, wherein the peripheral device comprises a printer; and, the instruction comprises a print command to print the document.

9. The method of claim 1, wherein the document represents a web page having links; and, said transmitting the image comprises:

dividing the image into a plurality of sections;

compressing the plurality of sections into a plurality of compressed sections respectively; and transmitting the plurality of compressed sections to the remote device in a sequence according to a display priority.

10. The method of claim 1, wherein the document contains displayable information in a non-image format; a portion of the image is rendered from the displayable information; and, the image is larger than a display area of the remote device.

11. A method to operate a peripheral device, the method comprising:

sending from the remote device to a server a request for a document;

receiving at least a first section of an image in a compressed format from the server at the remote device for display, the image being rendered at the server from the entire document;

displaying at the remote device the first section of the image;

sending from the remote device to the server an instruction to operate the peripheral device, the peripheral device being connected to a port of the remote device;

establishing a communication channel to receive control information from the server for applying onto the port of the remote device to operate the peripheral device under control of the server, the control information being generated at the server and recognizable by the peripheral device when applied onto the port;

wherein the instruction from the remote device is in connection with the image.

12. The method of claim 11, wherein the remote device contains no software device driver for the peripheral device connected to the port of the remote device.

13. The method of claim 12, wherein the remote device has no running operating system.

14. The method of claim 11, further comprising:

receiving an image from the server showing options to operate the peripheral device;

displaying the image on the remote device;

receiving user input relative to the image displayed on the remote device; and transmitting, from the remote device to the server, data specifying the user input relative to the image for the server to apply one or more options according to the data to operate the peripheral device.

15. The method of claim 11, wherein a two-way communication channel is established for communication between the server and the peripheral device through the port of the remote device to operate the peripheral device under the control of the server.

16. The method of claim 11, wherein the peripheral device comprises a printer.

17. The method of claim 16, wherein the instruction from the remote device requests to print a document; the server generates the control information according to the document for printing on the printer; and, the document is not received from the remote device.

18. The method of claim 11, wherein the control information is transmitted to the remote device via a wireless connection.

19. The method of claim 11, wherein the peripheral device comprises a printer; and, the instruction comprises a print command to print the image.

20. The method of claim 11, further comprising:

automatically receiving wirelessly at the remote device a second section of the image from the server after said displaying, the second section being outside a display area of the remote device when the first section of the image is displayed in the display area of the remote device; and storing the second section of the image in the remote device.

21. A server to operate a peripheral device, the server comprising:

means for receiving a request from a remote device for a document;

means for rendering the entire document into an image; and means for transmitting the image in a compressed format to the remote device for display;

means for receiving an instruction from the remote device to operate the peripheral device, the peripheral device being connected to a port of the remote device, means for generating control information which is recognizable by the peripheral device when applied onto the port;

means for communicating the control information to the remote device for applying onto the port of the remote device to operate the peripheral device under control of the server in response to the instruction;

wherein the instruction from the remote device is in connection with the image.

22. The server of claim 21, wherein the server contains a device driver to generate the control information.

23. The server of claim 21, further comprising:

means for generating an image showing options to operate the peripheral device;

means for transmitting the image to the remote device for display;

means for receiving from the remote device data specifying user input relative to the image; and means for applying one or more options to operate the peripheral device according to the data specifying the user input relative to the image.

24. The server of claim 21, wherein a two-way communication channel is established for communication between the server and the peripheral device through the port of the remote device to operate the peripheral device under the control of the server.

25. The server of claim 24, wherein the peripheral device comprises a printer.

26. The server of claim 25, wherein the instruction from the remote device requests to print a document; the server generates the control information according to the document for printing on the printer; and, the document is not received from the remote device.

27. The server of claim 21, wherein the control information is transmitted to the remote device via a wireless connection.

28. The server of claim 21, wherein the peripheral device comprises a printer; and, the instruction comprises a print command to print the document.

29. A machine readable medium containing executable computer program instructions which when executed by a data processing system cause said system to perform a method to operate a peripheral device, the method comprising:

receiving at a server a request from a remote device for a document;

rendering at the server the entire document into an image; and transmitting the image in a compressed format from the server to the remote device for display;

receiving at the server an instruction from the remote device to operate the peripheral device, the peripheral device being connected to a port of the remote device;

in response to the instruction, the server;

generating control information recognizable by the peripheral device when applied onto the port; and communicating the control information to the remote device for applying onto the port of the remote device to operate the peripheral device under control of the server;

wherein the instruction from the remote device is in connection with the image.

30. The medium of claim 29, wherein the server contains a software device driver to generate the control information to operate the peripheral device; and, the remote device contains no software device driver for the peripheral device connected to the port of the remote device.

31. The medium of claim 29, wherein the method further comprises:

generating at the server an image showing options to operate the peripheral device;

transmitting the image from the server to the remote device for display;

receiving at the server from the remote device data specifying user input relative to the image; and applying at the server one or more options to operate the peripheral device according to the data specifying the user input relative to the image.

32. The medium of claim 29, wherein a two-way communication channel is established for communication through the port of the remote device between the server and the peripheral device to operate the peripheral device under the control of the server.

33. The medium of claim 32, wherein the peripheral device comprises a printer.

34. The medium of claim 33, wherein the instruction from the remote device requests to print a document; the server generates the control information according to the document for printing on the printer; and, the document is not received from the remote device.

35. The medium of claim 29, wherein the control information is transmitted to the remote device via a wireless connection.

36. The medium of claim 29, wherein the peripheral device comprises a printer; and, the instruction is a print command to print the document.

37. The medium of claim 29, wherein the document represents a web page having links; and said transmitting the image comprises:

dividing the image into a plurality of sections;

compressing the plurality of sections into a plurality of compressed sections respectively; and transmitting the plurality of compressed sections to the remote device in a sequence according to a display priority.

38. The medium of claim 29, wherein the document contains displayable information in a non-image format; a portion of the image is rendered from the displayable information; and, the image is larger than a display area of the remote device.

39. A machine readable medium containing executable computer program instructions which when executed by a data processing system cause said system to perform a method to operate a peripheral device, the method comprising:

sending from a remote device to a server a request for a document;

receiving at least a first section of an image in a compressed format from the server at the remote device for display, the image being rendered at the server from the entire document; and displaying at the remote device the first section of the image;

sending from the remote device to the server an instruction to operate the peripheral device, the peripheral device being connected to a port of the remote device;

establishing a communication channel to receive control information from the server for applying onto the port of the remote device to operate the peripheral device under control of the server, the control information being generated at the server and recognizable by the peripheral device when applied onto the port;

wherein the instruction from the remote device is in connection with the image.

40. The medium of claim 39, wherein the remote device contains no software device driver for the peripheral device connected to the port of the remote device.

41. The medium of claim 39, wherein the method further comprises:

receiving an image from the server showing options to operate the peripheral device;

displaying the image on the remote device;

receiving user input relative to the image displayed on the remote device; and transmitting, from the remote device to the server, data specifying the user input relative to the image for the server to apply one or more options according to the data specifying the user input relative to the image.

42. The medium of claim 39, wherein a two-way communication channel is established for communication between the server and the peripheral device through the port of the remote device to operate the peripheral device under the control of the server.

43. The medium of claim 39, wherein the peripheral device comprises a printer.

44. The medium of claim 43, wherein the instruction from the remote device requests to print a document; the server generates the control information according to the document for printing on the printer; and, the document is not received from the remote device.

45. The medium of claim 39, wherein the control information is transmitted to the remote device via a wireless connection.

46. The medium of claim 39, wherein the peripheral device comprises a printer; and, the instruction comprises a print command to print the image.

47. The medium of claim 39, wherein the method further comprises:

automatically receiving wirelessly at the remote device a second section of the image from the server after said displaying, the second section being outside a display area of the remote device when the first section of the image is displayed in the display area of the remote device; and storing the second section of the image in the remote device.

* * * * *